Patented Oct. 24, 1950

2,526,757

UNITED STATES PATENT OFFICE 2,526,757

PREPARATION OF ETHYLENEUREA

Alfred T. Larson, Donald J. Loder, and Harry R. Dittmar, Wilmington, Del., assignors to E. I. du Pont de Nemours & Company, Wilmington, Del., a corporation of Delaware No Drawing. Original application March 1, 1944, Serial No. 524,524. Divided and this application September 20, 1947, Serial No. 775,380

2 Claims. (Cl. 260—309.9)

This invention relates to a process for the preparation of N.N′ethyleneurea, and more particularly to its preparation from urea and an ethylenic compound. This application is a division of our copending application S. N. 524,524, filed March 1, 1944, now U. S. P. 2,436,311.

N.N′ethyleneurea, hereinafter referred to as ethyleneurea, and otherwise known as 2 oxo imidazolidin and imidazolidon (2), has a melting point of 133.0° C., a boiling point of 192° C. at 10 mm. mercury pressure, a molecular weight of 86.07 and the structural formula

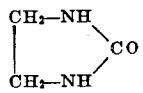

Various methods have been proposed for the preparation of this product, and it has been made by heating ethylene diamine with diethyl carbonate at 180° C. [E. Fisher, Koch, A 232, 227 (1886)], by warming an aqueous solution of N.N′-ethylene thiourea with freshly precipitated mercuric oxide [Klut Ar. 240, 677 (1887)] and by distillation of aqueous N.N′ethylene guanidine under diminished pressure [Pierron A 9 (11) 363 (1908)].

An object of the present invention is to provide improved processes for the preparation of ethyleneurea. Another object of the invention is to provide a process for the preparation of ethyleneurea from urea and ethylenic compounds, urea and ethylene diamine, urea and ethylene glycol, urea and ethanol amine. Still another object is to provide a process for the preparation of ethyleneurea from ethanol amine, water and urea. Yet another object is to provide procedural details for the preparation of ethyleneurea from the aforesaid reactants. A further object is to provide a process for the preparation of ethyleneurea from mixtures of ethylenic compounds with urea or its decomposition products under elevated temperatures and pressures. Other objects and advantages of the invention will hereinafter appear.

The H. W. Arnold patent, U. S. 2,145,242, patented January 31, 1939, describes the preparation of solid products by the reaction of a polyamine such as ethylene diamine with urea. M. Pacquin, in U. S. Patent 2,155,328, patented April 18, 1939, describes the preparation of condensation products from alkylene oxides, ethylene diamine and urea, the products being referred to as highly viscous water-soluble substances which are used for printing with fat-dyestuffs, and in his U. S. Patent 1,986,067 of January 1, 1935, describes the preparation of urea condensation products from urea and derivatives thereof with glycols.

There is no teaching in the Arnold patent that ethyleneurea is produced. In accord with Pacquin's later patent, urea is reacted with ethylene diamine in the presence of ethylene oxide and Pacquin likewise does not state that by his process ethyleneurea was obtained. In Pacquin's earlier patent there is no statement which directly or indirectly shows that he accidentally or otherwise prepared ethyleneurea. Arnold and Pacquin accordingly have carried out the reaction of ethylenic compounds with urea, but neither of these investigators states that he has obtained ethyleneurea by his process. In fact, the reaction conditions employed by these experimenters were such that no ethyleneurea was prepared by their processes.

The objects of this invention are realized by processes wherein ethyleneurea is prepared from urea and ethylenic compounds that may be described as alpha beta di-substituted ethanes in which the substituent in the alpha and/or beta position is linked to the carbon of the ethane group through a carbon-nitrogen, carbon-oxygen and/or carbon-halogen linkage. The processes may be illustrated by the equation:

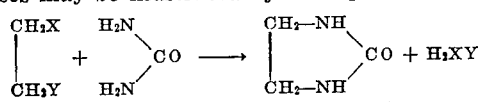

in which X and Y are hydroxyl groups; or, X is an amino and Y a hydroxyl group; or X and Y are halogen groups; or X is a halogen and Y is a hydroxy group; or, X and Y together represent an oxygen group; or the carbonate group OCOO. In place of urea, a mixture of carbon dioxide and ammonia may be used.

Broadly, the process of the invention may be described as involving the high temperature reaction of an ethylenic compound with urea or its decomposition products such as carbon dioxide and ammonia, the reaction under some conditions passing through a solid phase which disappears at temperatures above 200° C. For example, a pressure-resisting autoclave may be charged with the ethylenic compound and urea with or without water or ammonia and carbon dioxide. A pressure above atmospheric may be used in accord with a preferred embodiment of the invention by heating the reactants in a closed autoclave, the pressure being developed autogenously or by the introduction of ammonia, carbon dioxide or other inert gas.

The reaction is carried out until a temperature above 200° C. is attained, and preferably between 220 and 280° C., with a maximum of about 300° C. At temperatures above 300° C., the crude product is somewhat darkened in color, and accordingly it has been found preferable to complete the reaction at a temperature below 300° C. By employing such temperatures, high yields of ethyleneurea are realized from ethylenic compounds and urea especially if water is initially present. Pressures may be used and may range from atmospheric to 500 atmospheres or more and, if water is introduced into the reaction, should preferably be used in order to realize the high temperatures required.

The ratio of ethylenic compound to urea may vary over a wide range; for example, the urea may be present in excess or the ethylenic compound may be present in excess, giving in the latter instance basic reaction conditions. Accordingly, there may be present a ratio of ten or more moles of the ethylenic compound per mole of urea on a weight basis. When operating under any ratio, the temperature as has been stated should be preferably above about 200° C. Moreover, under any ratio in the case of ethylene diamine and urea, and especially with high ethylene glycol—low urea ratio pressures are recommended.

The reaction conditions employed for the preparation of ethyleneurea from ethanol amine and urea may vary widely, with particular regard to reactant proportions, and pressure and temperature of the reaction. More specifically, the ratio of urea to ethanol amine may range between, for example, 0.25 mole of ethanol amine to 8 moles thereof per mole of urea, and if ammonia is used, which however is not essential, it may be present in amounts on the same basis, between one to 8 moles per mole of urea.

For optimum results, ethylene diamine is reacted with urea in the presence of water and preferably the azeotrope of ethylene diamine and water (84% diamine, 16% water) is employed. It has been found that if water is omitted, for example, from an equimolecular charge of ethylene diamine and urea, the anhydrous mixture will react rapidly, resulting in the formation of a white solid product having a high melting point. If water is initially present, other things being equal, an excellent yield of ethyleneurea is obtainable from this product whether or not the reaction is conducted under elevated pressures. The solid products can be converted to ethyleneurea by subjecting them to a water treatment, or hydrolysis step or by heating the reaction mixture until it has dissolved which usually is accomplished at a temperature of about 270° C.

Ethanol amine may likewise be reacted with a mixture of ammonia and carbon dioxide in the absence of urea, and under such circumstances the ratio of ammonia and carbon dioxide to ethanol amine per mole of ethanol amine may be between from 3 to 4 moles of ammonia and between from 1 to 7 moles of carbon dioxide.

For the reaction of urea with ethylene glycol, ethyleneurea can be obtained by heating the glycol with the urea, utilizing any suitable ratio of glycol to urea and with pressures above 3 atmospheres, and temperatures of 200° C. or above. With mixtures containing an excess of urea, however, pressure is not required, but may be used; preferred temperatures in this instance may be from 200 to 300° C.

When employing the other ethylenic compounds, the general conditions specified may be used, and in each instance the intermediate product formed, which contains the potential ethyleneurea, is converted to ethyleneurea either by a separate process or by carrying the reaction temperature above 200° C.

The reaction will proceed in the absence of catalyst, but catalysts may be used if desired, to speed up the reaction, and for this purpose catalysts such as zinc chloride, sodium ethoxide, sodium methoxide or ammonium sulfate may be employed.

The converter in which this step and the other steps of the reaction may be carried out may be lined with silver, chromium, chrome steel, or constructed of corrosion-resisting material in order to resist the corrosive action of the reactants.

The transformation of the condensation products which may contain potential ethyleneurea to ethyleneurea, involves heating the product above 200° C. as described above or alternatively the condensation product may be discharged into water to give a solution containing from 25 to 75% of the condensation product. Owing to the presence of by-products and insoluble or partially soluble materials, solution is not usually complete. After admixing the product with water, this step of the process may be carried out by several general methods.

In accord with the continuous pressure processing method, the aqueous solution of the condensation product from step one is passed through a heated tube under pressure, or into a pressure-resisting autoclave. The crude product from synthesis charges, from, for example, a melt obtained from 5 moles of urea per mole of glycol, is preferably diluted with 2 lbs. of water per 3 lbs. of the product prior to introducing the mixture into the heated tube. As dilution with water to less than about 30% causes separation of a heavy, semi-solid phase which tends to clog pumps, the amount of water is preferably maintained above 30%. Optimum concentrations for the condensation product generally are between 30 and 70% on a weight basis. The dilution is preferably accomplished by dumping the hot melt directly into cold water with agitation of the water, the melt during its rapid cooling being comminuted, and thereby rapidly dissolved and/or dispersed.

The temperature of the water treatment should be between 200 and 300° C., and preferably between 250 and 280° C., although higher, and for that matter lower, temperatures may be employed according to the time of contact. For example, in the reaction of urea with ethylene glycol at 250° C. the time of contact for water treatment is in the order of 70 minutes and may be cut to 35 minutes with temperatures in the order of 270° C. for optimum results. Pressures are not critical, although they speed up the reaction and may range from 10 to 100 atmospheres or higher.

Alternatively, the products may be treated in a suitable closed chamber, diluted as described aforesaid, and heated to the above indicated temperatures, under similar pressures until the optimum amount of the crude product has been converted to ethyleneurea. Such treatment may be carried out via steam distillation, the crude product being dissolved in water as described, and the resulting solution subjected to steam distillation under sub-, normal-, or superatmospheric pressures.

The separation, or purification, of the ethyleneurea from the final mixture may be effected by rectification. This may be accomplished by charging a suitable still with the product and stripping off the water and dissolved gases under atmospheric pressure. Subsequent to the stripping, the pressure is reduced to 100 mm. mercury absolute pressure or less, and the temperature increased, to remove all substances volatile under these conditions.

The refined ethyleneurea may be discharged from the purifying still receiver directly to a rotating cold flaker roll, upon which the ethyleneurea solidifies as the roll revolves, the product being removed therefrom by a suitable doctor-knife to give a flaky material. Since ethyleneurea tends to form a hemi-hydrate, humid air is excluded during this operation and the packaging of the product.

Alternatively, the product may be subjected to crystallization for the separation of the ethyleneurea, the crystallization being conducted in a suitable solvent therefor.

The examples illustrate preferred embodiments of the invention, wherein parts are by weight unless otherwise indicated.

*Example 1.*—The first step of the process was conducted in a silver-lined pressure-resisting autoclave, provided with a reflux condenser and charged with 12.02 parts of urea dissolved in 3.55 parts of glycol, molecular weight ratio of urea:glycol, 3.5:1. Solution of the urea was effected at a temperature of approximately 140° C. The heating time from solution temperature to 175° C. was approximately 6.5 hours; the time from 175 to maximum temperature, 250° C., 4.25 hours; and the time at maximum temperature, approximately 2.5 hours.

The crude melt obtained by the above first step of the process was discharged directly and without cooling into 1½ lbs. of water per lb. of melt. The resulting mixture was further diluted to give a mixture containing 6.3 parts of melt to 9.5 parts of water, and the resulting mixture was continuously introduced at the rate of 18 cc. per minute into a tubular, pressure-resisting converter consisting of a helical coil of approximately ½" inside diameter and 10' in length. The melt was heated in this coil to a temperature of approximately 250° C. under a pressure of approximately 500 lbs. per sq. in.; the contact time of the mixture at temperature was approximately 35 min.

The thus treated product from the second step was charged into a suitable still, and the dissolved gases and water stripped from the mixture under atmospheric pressure, using a 1:1 reflux ratio and a pot temperature rising to a final value approximately between 150 and 170° C. By-products were then removed by distillation under pressure of approximately 70 mm. mercury absolute pressure, and a pot temperature up to 190 to 200° C. The resulting residue was fed into an evaporator and cyclone separator in which it was separated into semi-refined ethyleneurea as distillate and high boiling by-products as residue, under 5 mm. mercury absolute pressure, at a temperature of about 250° C. The semi-refined product was then further purified by distillation in a batch-still, under a head pressure at 5 mm. mercury absolute, the ethyleneurea distilling at a head temperature of approximately 179° C. The ethyleneurea was obtained in a conversion based on the glycol of 55%.

*Example 2.*—(A) 360 parts of urea were dissolved in 93 parts of ethylene glycol giving a molar ratio of 4:1 urea:glycol, and the resulting mixture gradually heated in a suitable reaction vessel to a temperature between 160 to 180° C. over a period of 6.5 hours, from a temperature of 180 to 240° C. over a period of 3 hours, and at a temperature of 240° C. for one hour. 172 parts of crude melt was recovered and subjected without water treatment to simple vacuum distillation for the recovery of ethyleneurea. The conversion of ethylene glycol to ethyleneurea was approximately 25%.

(B) A reaction converter was charged with 1680 parts of urea and 434 parts of ethylene glycol, giving a mole ratio of 4:1. The reaction was carried out under conditions substantially identical with those employed in A, and 830 parts of the crude melt were produced. This crude melt was subjected to transformation in accord with the second step of the process, conducted substantially in accord with that step as described in Example 1. From this transformed crude melt, ethyleneurea was recovered with a conversion of approximately 55% based on ethylene glycol.

Table I represents a series of examples conducted substantially in accord with the procedure described in Example 1 for the first step, except for the variations in concentrations, temperatures and other items noted, with the procedure of Example 1, except as stated under column 8, for the third step. The continuous procedure of step 2 is illustrated by step 2 of Example 1, while the discontinuous procedure may be carried out batchwise in a suitable autoclave under the conditions specified in Table I.

*Table I*

| | 3 | 4 | 5 | 6 | 7 | 8 |
|---|---|---|---|---|---|---|
| STEP I | | | | | | |
| Charge (parts by weight): | | | | | | |
| Urea | 77.2 | 77.2 | 77.2 | 12.02 | 12.02 | 39.38 |
| Glycol | 22.8 | 22.8 | 22.8 | 2.49 | 2.49 | 10.2 |
| Urea/Glycol (mole per mole) | 3.5 | 3.5 | 3.5 | 5.0 | 5.0 | 5.0 |
| Reaction: | | | | | | |
| Pot temp.—start, ° C | 140 | 140 | 140 | 150 | 150 | 144 |
| Pot temp.—end, ° C | 253 | 253 | 253 | 251 | 251 | 225 |
| Time to 175° C., Hrs | 8.5 | 8.5 | 8.5 | 8.0 | 8.0 | 6.0 |
| Time 175 to Max. Temp | 5.5 | 5.5 | 5.5 | 4.0 | 4.0 | 5.0 |
| Time at Max. Temp | 4.5 | 4.5 | 4.5 | 0 | 0 | 0 |
| Weight of Crude Melt | 33 | 33 | 33 | 5.99 | 5.99 | 20.4 |
| STEP II | | | | | | |
| Discontinuous: | | | | | | |
| Wt. ratio, melt:water | 1:1 | 1:1 | | 1:1 | | |
| Pot. Temp., ° C | 255 | 248 | | 250 | | |
| Pressure, p. sq. in | 395 | 420 | | | | |
| Total time, hrs | 2 | 2 | | 2 | | |
| Continuous: | | | | | | |
| Crude melt, lbs | | | 5.87 | | 2.21 | 6.35 |
| Water, lbs | | | 9.58 | | 3.31 | 9.52 |
| Solids, per cent | | | 40 | | 40 | 40 |
| Temp., ° C | | | 270 | | 250 | 250 |
| Pressure, p. sq. in | | | 500 | | 500 | 500 |
| Contact time, hrs | | | 21 | | 68.5 | 31 |
| STEP III (same as Example 1) | | | | | | |
| Conversion glycol to ethyleneurea | 47.8 | 51.5 | 42.2 | 54 | 55 | [1] 22 |

[1] Crystallized.

*Example 9.*—A silver-lined pressure-resisting autoclave was charged with one mole of urea, 1 mole of ethanol amine, 1 mole of water and 4 moles of ammonia. The reaction was conducted at a temperature of 275° C. and under a pressure above 200 atmospheres for a period of 40 minutes. A yield of recrystallized ethylene-urea of 44% was obtained.

*Example 10.*—A silver-lined, pressure-resisting autoclave was charged with 1 mole of urea, 1 mole of ethanol amine and 5 moles of ammonia. The reaction was conducted at a temperature of 250° C. under a pressure of 425 atmospheres for 40 minutes, and from the reaction product ethyleneurea was obtained in a yield of 48%.

*Example 11.*—A silver-lined pressure-resisting autoclave was charged with ½ mole of ethanol amine, 7 moles of ammonia and 1 mole of carbon dioxide. The reaction was conducted at a temperature of about 300° C., under a pressure of 1,050 atmospheres for approximately 10 min. The reaction product contained approximately 73% crude ethyleneurea, which yielded a high percentage of the crystallized product.

*Example 12.*—A silver-lined pressure-resisting autoclave was charged with 1 molecular weight of urea and 1 molecular weight of ethanol amine. The reaction was conducted at a temperature of approximately 295° C. under autogenous pressure for a period of approximately 40 min. From the crude reaction product, ethyleneurea was obtained in a yield of approximately 40%.

*Example 13.*—The ethylene diamine-urea process may be conducted either by way of a batch discontinuous process, or by way of a continuous process. The batch operation may be carried out by charging a suitable reaction vessel with an equimolar mixture of ethylene diamine and urea. The mixture is heated to effect solution of the urea in the ethylene diamine, and the heating continued until the reaction mixture solidifies, which point is reached at a temperature between approximately 150 and 160° C. The solid does not begin to melt until a temperature of about 200° C. is reached, and is not completely in solution until a temperature of about 270° C. is reached.

The solid product obtained at 150° C. to 160° C. may be separated, and will be found to contain but a small amount of ethyleneurea, but the solid product may be subjected to treatment in order to convert it to ethyleneurea. This may, for example, be done in accord with the water treatment or hydrolysis step described above, or the solid may be heated further to a temperature above 200° C., at which temperature it begins to melt, and when the solid has completely melted, which requires a temperature of about 270° C. or above, substantially all of it has been converted to ethyleneurea.

This operation may be conducted by merely continuing the heating until complete solution has been effected and the above temperature attained, or, if desired, the solid material may be removed from the vessel, crushed, and heated in an inert liquid which does not react with the ethyleneurea and by means of which heat can be readily added to the solid, the heating in this instance being continued until the temperature of about 270° C. or above is attained.

Alternatively, it has been found that the solid reaction product is soluble in ethylene diamine, and accordingly if the reaction is conducted with an excess of at least 5% ethylene diamine instead of a solid product from at a temperature of 150 to 160° C., a slurry forms which can be readily heated to the maximum temperature required to completely solubilize and completely convert the solid to ethyleneurea.

The process, if desired, may be carried out continuously by passing the ethanolamine and urea with or without ammonia continuously into a reaction zone, e. g. a long silver-lined and jacketed reaction tube, wherein the reaction is conducted under the above defined conditions, the product being continuously discharged from the tube, preferably at the end opposite the entrance. The tube may be charged with inert solid material such as charcoal, silica gel and the like to aid in effecting intimate contact between the reactants with or without a catalyst such as has been described.

*Example 14.*—A reaction was carried out by continuously injecting a ratio of 1½ moles of ethylene diamine and 1 mole of urea into a silver-lined tubular pressure resisting converter of ¼″ I. D. and 80′ in length, the reaction being conducted therein at a pressure of about 75 atmospheres with a reaction time of from 12 to 15 min. The product was continuously discharged from the converter into a fractionating column, the water distilled off and the residue subsequently treated in a stripping column for the removal of unconverted ethylene diamine which was returned to the converter. The stripped product was then distilled for the recovery of ethyleneurea in a conversion per pass of about 55%, based on the urea introduced.

We claim:

1. A process for the preparation of ethyleneurea which consists in subjecting urea to a reaction with a substituted ethane as illustrated by the equation:

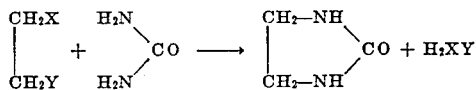

in which

is of the group consisting of ethanol amine, ethylene chlorohydrin, ethylene dichloride, ethylene oxide and ethylene carbonate at approximately atmospheric pressure, at a temperature from 200° C. to below the decomposition temperature of ethyleneurea, and separating ethyleneurea from the reaction product.

2. A process for the preparation of ethyleneurea which consists in subjecting urea to a reaction with a substituted ethane as illustrated by the equation:

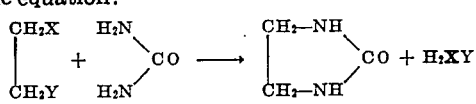

in which

is of the group consisting of ethanol amine, ethylene chlorohydrin, ethylene dichloride, ethylene oxide and ethylene carbonate at approximately atmospheric pressure, at a temperature between 200° and 300° C. and separating ethyleneurea from the reaction product.

ALFRED T. LARSON.
DONALD J. LODER.
HARRY R. DITTMAR.

REFERENCES CITED

The following references are of record in the file of this patent:

UNITED STATES PATENTS

| Number | Name | Date |
| --- | --- | --- |
| 2,436,311 | Larson et al. | Feb. 17, 1947 |
| 2,416,046 | Dittmar et al. | Feb. 18, 1947 |
| 2,425,627 | Loder et al. | Aug. 12, 1947 |